(12) United States Patent
Hanson (10) Patent No.: US 9,834,915 B2
(45) Date of Patent: Dec. 5, 2017

(54) SINK ASSEMBLY

(71) Applicant: SMART SINKS PTY LTD, Queensland (AU)

(72) Inventor: Craig Hanson, Queensland (AU)

(73) Assignee: SMART SINKS PTY LTD, Bulimba, Brisbane (AU)

(*) Notice: Subject to any disclaimer, the term of this patent is extended or adjusted under 35 U.S.C. 154(b) by 344 days.

(21) Appl. No.: 14/680,567

(22) Filed: Apr. 7, 2015

(65) Prior Publication Data
US 2015/0368889 A1 Dec. 24, 2015

(51) Int. Cl.
| E03C 1/232 | (2006.01) |
| E03C 1/242 | (2006.01) |
| E03C 1/18 | (2006.01) |
| B01D 21/30 | (2006.01) |
| B01D 21/34 | (2006.01) |
| B01D 21/02 | (2006.01) |

(52) U.S. Cl.
CPC ............ *E03C 1/242* (2013.01); *B01D 21/307* (2013.01); *B01D 21/34* (2013.01); *E03C 1/18* (2013.01); *B01D 21/02* (2013.01)

(58) Field of Classification Search
CPC ...................................................... E03C 1/242
USPC .......... 4/654, 263, 682, 619; 210/767, 532.1
See application file for complete search history.

(56) References Cited

U.S. PATENT DOCUMENTS

| 526,508 | A | * | 9/1894 | Stevens, Jr. ............... | E03C 1/23 4/651 |
| 2,071,160 | A | * | 2/1937 | Boosey ..................... | E03F 5/16 210/532.1 |
| 3,613,131 | A | * | 10/1971 | Stram et al. ........... | A61C 17/14 4/263 |
| 4,268,392 | A | * | 5/1981 | Hayes ..................... | E03C 1/264 210/238 |
| 6,017,462 | A | * | 1/2000 | Rains ................. | B01D 21/0003 210/801 |
| 6,537,446 | B1 | * | 3/2003 | Sanguinetti ........... | E03F 5/0404 210/163 |
| 2006/0275083 | A1 | * | 12/2006 | Wimberger ............... | E03F 1/00 405/40 |

* cited by examiner

*Primary Examiner* — Christine Skubinna
(74) *Attorney, Agent, or Firm* — Davis & Bujold PLLC; Michael J. Bujold (57) ABSTRACT

The present invention is directed to a sink assembly that can separate particulate contaminants from a liquid in which they are suspended. The sink assembly includes a master trap and at least a first trap with a riser and valve assembly to collect particulates and prevent overflow from the master trap. The sink assembly provides a simple maintenance and cleaning solution.

8 Claims, 9 Drawing Sheets

SINK ASSEMBLY

FIELD OF INVENTION

The present invention relates to particulate trapping and drainage systems. The present invention has particular but not exclusive application with sinks used to trap and drain particulate contaminated liquids.

BACKGROUND OF THE INVENTION

Operations and processes such as those used in dental laboratories, painting, drilling, cutting, and the like produce waste products in the form of particulate contaminated liquid. The particulate contaminated liquid resultant from such processes contains a mixture of particulate matter suspended in the liquid. Proper disposal of particulate contaminated liquids dictates that the particulate contaminates should first be trapped before permitting the liquid permitted to drain away.

To facilitate the proper disposal of such particulate contaminated liquids, trapping and drainage sink systems have been developed. Conventional trapping and drainage sink systems allow particulate contaminants to settle out of the liquid into a catchment area. After the particulate contaminants are settled into the catchment area, the liquid is drained away via an egress not typically accessible by the settled particulate contaminants.

For example, U.S. Pat. No. 6,017,462 describes a sink liner apparatus, and a method for using the apparatus, for removing plaster from waste water. The apparatus has a catch basin to catch the waste water contaminated with plaster and directs it into a sedimentation basin. The sedimentation basin allows the plaster to precipitate into the sedimentation basin, which can be periodically cleaned or replaced. The waste water overflows through a sedimentation basin draining aperture into a sink basin. The sink basin supports the sedimentation basin and also directs the waste water into a sink draining aperture for separate disposal.

One disadvantage of conventional drainage sink systems, however, is the difficulty and complexity involved in cleaning out the catchment area. The cleaning out of the particulate contaminants in conventional drainage sink systems typically involves accessing inconvenient spaces (such as under benches), undoing and reconnecting pipes and other connections, and/or manually scooping out the particulate contaminants from the catchment area.

A further disadvantage of conventional drainage sink systems is that after the catchment area is full, particulate contaminants are no longer trapped in the catchment area. Consequently, further input of particulate contaminated liquids into conventional drainage sink systems results in the contaminated liquids being allowed to drain away with particulate contaminants still suspended therein.

OBJECT OF THE INVENTION

It is one object of the present invention to provide a particulate trapping and drainage system that facilitates safe and easy disposal of particulate contaminants trapped thereby.

It is another object of the present invention to provide a particulate catching drainage sink system that has multiple cascaded levels of contaminant trapping, such that the failure of one level does not immediately result in a total failure of the system to trap and contain the contaminants.

It is a further object of the present invention to provide a particulate catching drainage sink system that automatically prevents contaminated liquids from draining away when a predetermined number of levels of contaminant trapping have failed.

This and other objects of the present invention will be made apparent from the following disclosure of the invention.

SUMMARY OF THE INVENTION

According to a first aspect of the present invention, a trapping and drainage system is provided. The trapping and drainage system includes a master trap, and a first trap removably supported in the master trap, wherein the first trap includes a flange defined along an external surface thereof, the flange is adapted to rest on a ledge or a plurality of lugs defined along an inner surface of the master trap to thereby support the first trap within the master trap.

In one form, the trapping and drainage system further includes a valve sub-assembly, the valve sub-assembly coupled to a draining aperture of the first trap and configured to control a flow of liquid from the first trap.

In a further form, the trapping and drainage system further includes a riser sub-assembly, the riser sub-assembly configured to removably couple with the valve sub-assembly, the riser sub-assembly having a valve actuator for actuating a valve in the valve sub-assembly.

In a further form, the trapping and drainage system further includes a second trap, the second trap removably situated in the master trap under an outlet of the valve sub-assembly, wherein the second trap partially receives within a volume thereof the valve sub-assembly.

In a further form, the valve sub-assembly defines a conduit facilitating a draining of liquid from the first trap through to the second trap.

In a further form, the valve sub-assembly includes a mushroom valve positioned within the conduit, the mushroom valve configured to actuate between a sealed position and an unsealed position, wherein in the sealed position the conduit is sealed to prevent draining of liquid from the first trap through to the second trap.

In a further form, the valve sub-assembly includes a valve biaser, the valve biaser coupled to the mushroom valve and adapted to bias the mushroom valve towards the sealed position.

In a further form, the mushroom valve is adapted to be actuated to the unsealed position by the valve actuator of the riser sub-assembly.

In a further form, the riser sub-assembly removably couples to the valve sub-assembly by a bayonet coupling.

In a further form, the trapping and drainage system includes a third trap removably situated in the master trap, the third trap having a height less than that of the second trap.

In a further form, the second trap is situated in the third trap, and a footprint of the second trap takes up approximately three-quarters or less of a bottom surface area of the third trap.

In a further form, the third trap has a footprint taking up approximately three-quarters or less of a bottom surface area of the master trap.

In a further form, the first trap defines drainage perforations along a lip thereof, the drainage perforations forming conduits facilitating the draining of liquid in the first trap directly to the master trap.

In a further form, the master trap defines a master draining aperture, the master draining aperture configured for coupling to a drainage system external to the trapping and drainage system of the present invention.

In a further form, the draining aperture of the first trap is offset from a centre of the first trap.

In a further form, the master draining aperture of the master trap is offset from a centre of the master trap.

In a further form, the second trap includes handles for facilitating a removal of the second trap from within the master trap.

In a further form, the third trap includes handles for facilitating a removal of the third trap from within the master trap.

In a further form, the master trap defines on an inner surface thereof a plurality of positioning lugs, the positioning lugs adapted to position and substantially hold in place the second trap and the third trap.

In a preferred aspect the present invention broadly resides in a sink assembly including
a master trap;
a first trap mountable within the master trap, the first trap positionable on a plurality of lugs or ledge extending inwardly from an inner surface of the master trap;
a riser and valve assembly coupled to a draining aperture in the first trap and configured to control a flow of liquid from the first trap, wherein the height of an opening in the riser and valve assembly is lower than the height of the top of the first trap, thereby allowing liquid to pass through the riser and valve rather than overflow the first trap.

In a further preferred aspect the present invention broadly resides in a sink assembly including
a master trap;
a first trap mountable within the master trap, the first trap positionable on a plurality of lugs or ledge extending inwardly from an inner surface of the master trap, said first trap having a draining aperture;
a second trap mountable below the first trap draining aperture; and
a riser and valve assembly coupled to the first trap draining aperture and configured to control a flow of liquid from the first trap, a valve of the riser and valve assembly closes when an actuator portion of a riser is removed, wherein the height of an opening in the riser and valve assembly is lower than the height of the top of the first trap, thereby allowing liquid to pass through the riser and valve rather than overflow the first trap.

In another preferred aspect the present invention broadly resides in a sink assembly including
a master trap;
a first trap mountable within the master trap, the first trap positionable on a plurality of lugs or ledge extending inwardly from an inner surface of the master trap, said first trap having a draining aperture, said first trap having one or more drainage perforations surrounding the top of the first trap;
a second trap mountable below the first trap draining aperture;
a third trap positionable within the master trap and having the second trap located therein; and
a riser and valve assembly coupled to the first trap draining aperture and configured to control a flow of liquid from the first trap, a valve of the riser and valve assembly closes when an actuator portion of a riser is removed, wherein the height of an opening in the riser and valve assembly is lower than the height of the top of the first trap, thereby allowing liquid to pass through the riser and valve rather than overflow the first trap, wherein liquid overflowing the first trap can drain through the one or more drainage perforations.

Preferably the default position of the valve of the riser and valve assembly is closed.

When the riser assembly portion is removed, the valve of the valve assembly portion is closed.

When the second trap is substantially full and the riser and valve assembly is blocked, no liquid can pass through the riser and valve assembly.

Preferably there is a disposable filter bag positionable in the one or more of the traps.

Preferably a disposable filter bag can be positioned within the first trap to collect settled particulate matter.

Preferably a disposable filter bag can be positioned within the second trap to collect settled particulate matter.

Preferably a disposable filter bag can be positioned within the third trap to collect settled particulate matter.

The above aspects, variations, and options are to be understood as comprisable within the invention singly or in combination with each other.

BRIEF DESCRIPTION OF THE DRAWINGS

In order that the present invention can be more readily understood, reference will now be made to the accompanying drawings which illustrate preferred embodiments of the invention and wherein:

FIGS. 1A to 1C show side, front and top views respectively of the trapping and drainage system according to a preferred embodiment of the present invention while

DETAILED DESCRIPTION OF PREFERRED EMBODIMENTS

FIG. 1 illustrates a trapping and drainage system 100 according to a preferred embodiment of the present invention. The system 100 is designed to facilitate the separation of particulate contaminants from a liquid, and to subsequently allow the substantially contaminant-free liquid to drain away.

Figure 1A:
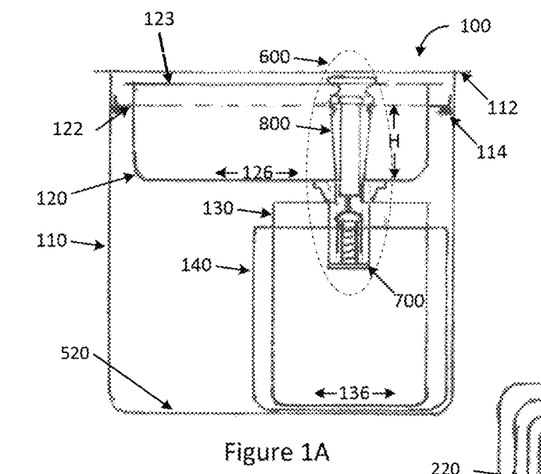
Figure 1B:
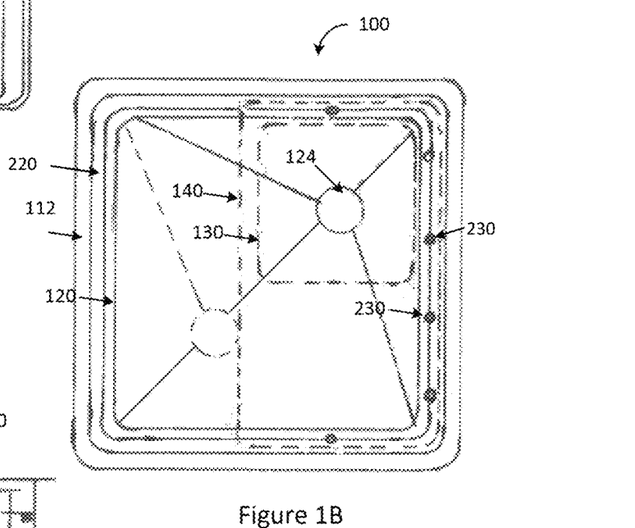
Figure 1C:
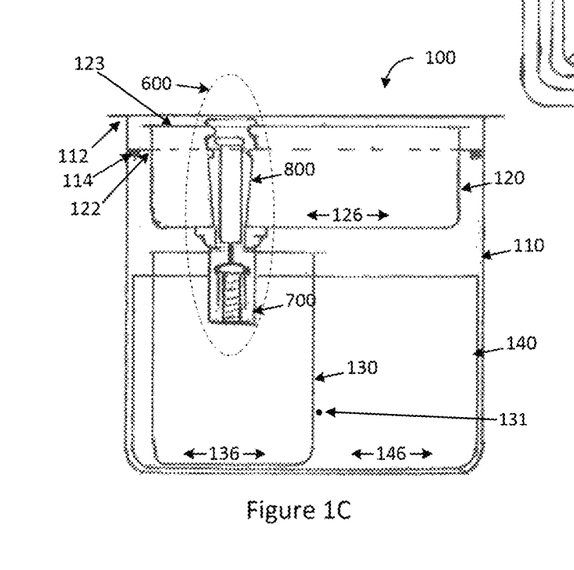

The trapping and drainage system 100 comprises a master trap 110, within which are removably situated a first trap 120, a second trap 130, and a third trap 140. The master trap 110, in a preferred form, is installed into a workbench in a top-mounted arrangement, where a lip 112 of the master trap 110 rests on top of a surface of the workbench. In other forms, the master trap 100 may be integrated with the bench, top-mounted with a sunken configuration, bottom-mounted with respect to a workbench, or be configured as a stand-alone mobile unit.

The first trap 120 is situated near a top of the master trap 110, and supported by the master trap 110 via a ledge or other protrusion 114 protruding from an inner surface of the master trap 110. The first trap 120 has a floor 126 for receiving the particulate containing contaminated liquid. The particulates from the particulate containing contaminated liquid precipitate, settle and collect on the first trap floor 126. In one form, the first trap 120 is provided with a flange 122 that extends around the outside of the first trap 120 and locatable on the ledge 114. The first trap 120 defines a draining aperture 124 positioned at a lowest point on the floor 126 of the first trap 120. In one form, the bottom surface of the first trap 120 is shaped with a gradient leading downwards to the draining aperture 124. The draining aperture 124 is offset from the center of the first trap floor, and is preferably located towards a corner of the first trap 120.

The draining aperture 124 is adapted to couple with a valve sub-assembly 700. In one form, the valve sub-assembly 700 and the draining aperture 124 are coupled by a screw/threaded mechanism.

A riser sub-assembly 800 is coupled to the valve sub-assembly 700 to form a riser-valve assembly 600. The riser sub-assembly 800 rises to a predetermined height H. The height H of the riser sub-assembly 800 determines a maximum height to which particulate contaminants can build up in the first trap 120 before the first trap 120 is no longer able to trap therein particulate contaminants.

The riser-valve assembly 600 controls a flow of liquid in the first trap 120 to the second trap 130. The operation of the riser-valve assembly 600 will be described in greater detail below.

Figure 1D:
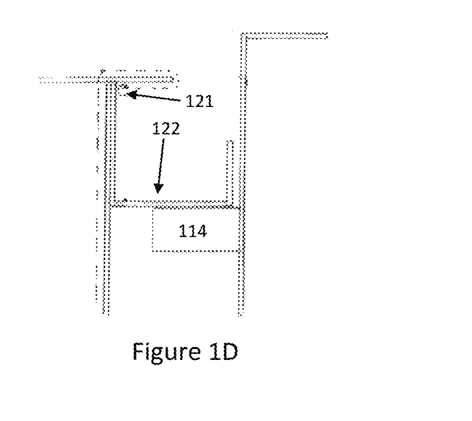
FIG. 1D is a partial diagrammatic view of the positioning of the filter bag with the first trap.

Optionally there can be a filter bag 121 positioned within the first trap to collect the particulates and provide easy disposal of the collected particulates. The filter bag 121 is preferably made of netting or mesh material with a consistent pore size. The ends of the filter bag 121 are located within the groove 801 of the riser sub-assembly 800 and over the top flange 123 that surrounds the top of the first trap 120. The ends of the filter bag 121 are maintained in position with a draw string arrangement.

Liquid flows from the first trap 120 through the riser opening 802 in the riser sub-assembly 800 and into the second trap 130. The riser opening 802 is below the top of the first trap 120.

The second trap 130 is situated below the first trap 120 under the draining aperture 124. The second trap 130 has a height so that the valve sub-assembly 700 is at least partially received within the second trap 130. Alternatively, the valve sub-assembly 700 can be provided with a length so as to at least partially protrude into the second trap 130. The second trap 130 has a settlement floor 136, wherein liquid draining from the first trap 120 is received and collected. The second trap 130 allows further settlement and separation of particulate contaminants from the liquid, and acts as an overflow trap when the first trap 120 is full and allows contaminated liquid to spill over. The second trap allows particulate contaminants to settle up to the end of the valve sub-assembly 700 that extends within the second trap 130. When the level of particulate contaminants reaches the valve sub-assembly 700 in the second trap 130, further discharge of liquid from the first trap 120 into the second trap 130 is substantially blocked.

In a preferred form, the second trap 130 is positioned within the third trap 140, such that liquid overflow from the second trap 130 is caught by the third trap 140. The third trap 140 is sized to allow positioning of the second trap 130 within the third trap 140. The third trap 140 has a height that is lower than that of the second trap 130. The third trap 140 forms a settlement floor 146 that further allows particulate contaminants to settle and separate from the liquid. When full, either with particulate contaminants, liquid, or both, liquid in the third trap 140 spills over into a bottom of the master trap 110, where it is allowed to drain away and be discharged within the storm-water or sewerage drainage system.

Figures 2A, 2B, 2C:
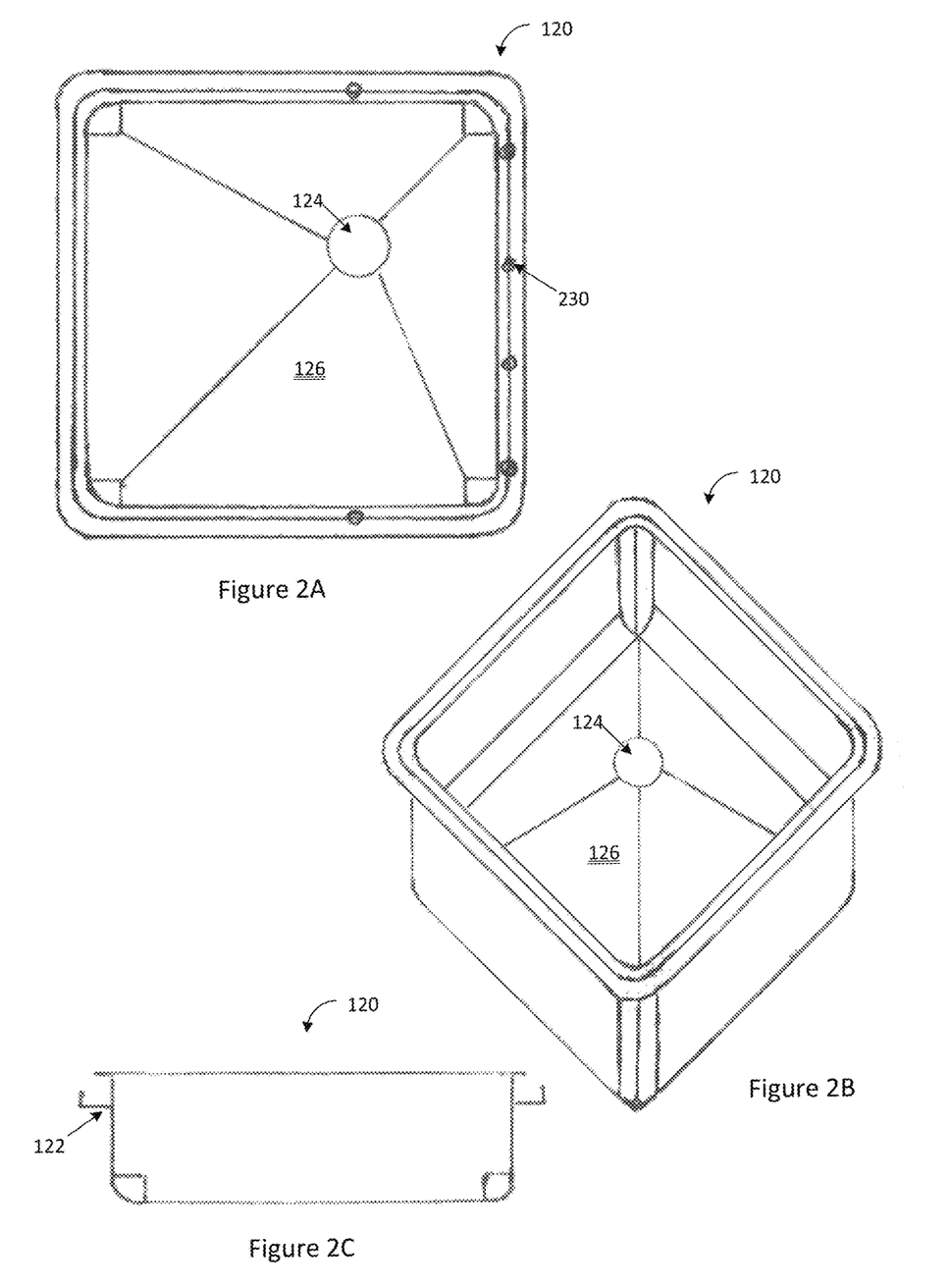
FIGS. 2A to 2C show top, perspective, and side views respectively of the first trap in the drainage system.

With reference to FIGS. 2A-2C, the first trap 120 is described in greater detail. The first trap 120 according to the preferred embodiment is an approximately rectangular or square volume adapted to fit within the master trap 110. It will be understood by a skilled addressee that the first trap 120 may take other shapes, as may be required for specific purposes. The first trap 120 includes a flange 122. The flange 122, in one form, is welded to an external side of the first trap 120. In other forms, the flange 122 may be an integral protrusion of the first trap 120, or attached to the first trap 120 by other means including glue, screws, nuts, brackets, and clamps. The flange 122 supports the first trap 120 on the ledge 114 of the master trap 110.

The first trap 120, as best illustrated in FIG. 2A, is provided with drainage perforations 230 along a lip thereof. The drainage perforations 230 allows liquid to drain down an outside of the first trap 120 directly into the third trap 140. The drainage perforations 230 are provided as a fall back mechanism to prevent liquid from overflowing the master trap 110.

As the top of the first trap 120 is below the top of the master trap 110, any overflow from the first trap 120 passes through the drainage perforations 230 so that liquid does not spill over the top of the master trap 110.

The first trap 120 further includes the aforementioned draining aperture 124 offset from a center thereof. The draining aperture 124 is adapted to couple with the riser-valve assembly 600. A sloping floor 126 is provided to assist with drainage of liquids through the draining aperture 124, for example during cleaning, and with pooling of liquid in the vicinity of the riser-valve assembly 600, for example to assist with drainage via the riser-valve assembly 600.

Figure 3A:
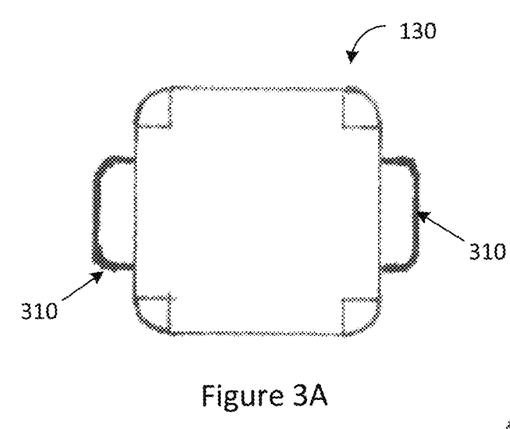
FIGS. 3A to 3C show top, perspective, and side views respectively of a second trap in the drainage system.
Figure 3B:
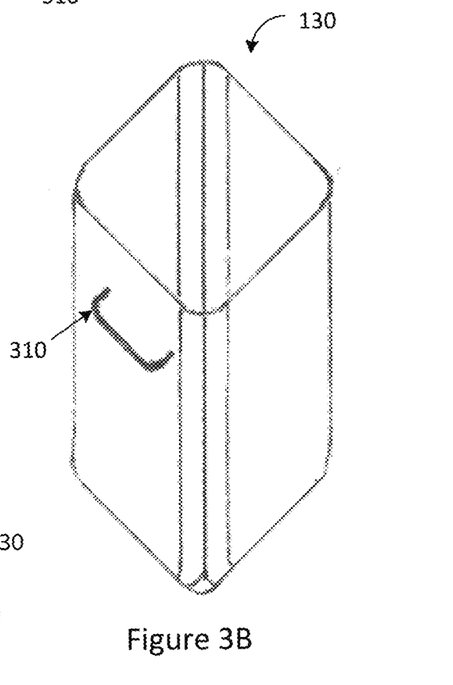
Figure 3C:
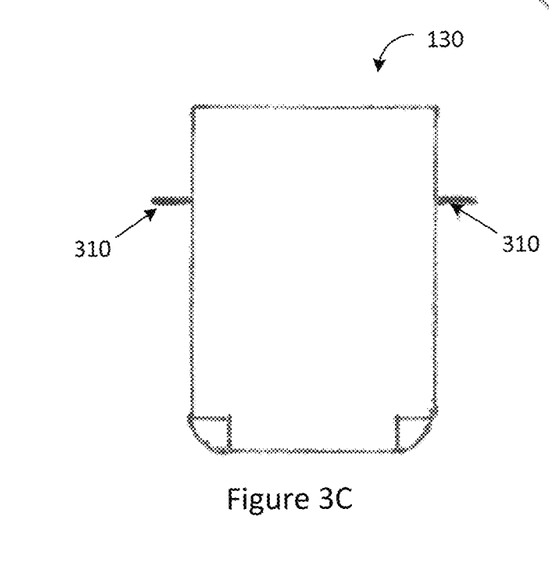

With reference to FIGS. 3A-3C, the second trap 130 is described in greater detail. The second trap 130 according to the preferred embodiment is an approximately square or rectangular volume adapted to fit within the third trap 140. It will be understood by a skilled addressee that the second trap 130 may take other shapes, as may be required for specific purposes. The second trap 130, in a preferred form, has a tall profile to assist with the positioning of the riser-valve assembly 600. Additionally, the second trap 130 is preferably sized to cover approximately three-quarters or less of the floor of the third trap 140. More preferably, the second trap 130 covers approximately half or less of the floor of the third trap 140.

Handles 310 are provided on an outside of the second trap 130 to assist with the removal of the second trap 130 from the third trap 140 and master trap 110.

Figures 4A, 4B, 4C:
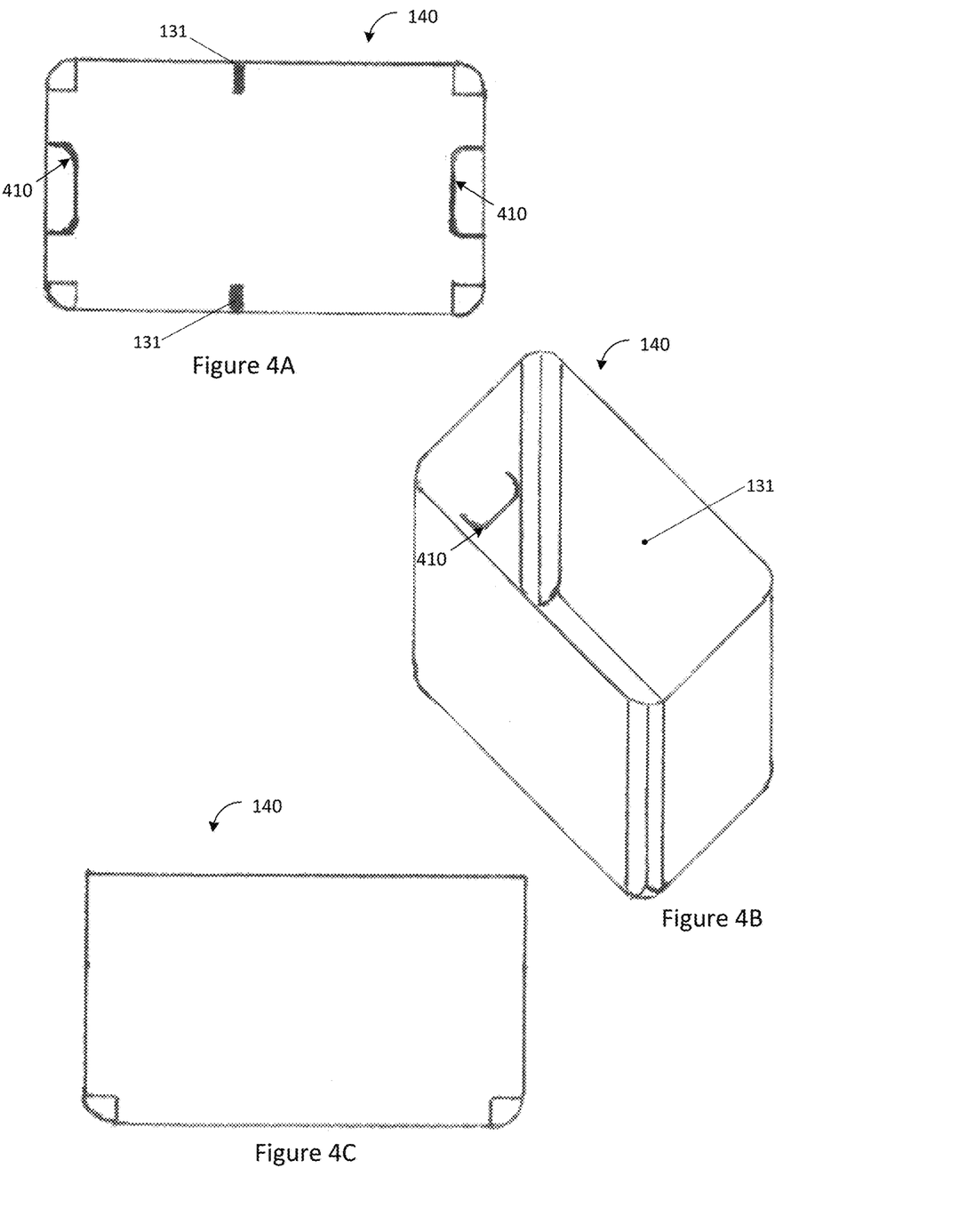
FIGS. 4A to 4C show top, perspective, and side views respectively of a third trap in the drainage system.

With reference to FIGS. 4A-4C, the third trap 140 is described in greater detail. The third trap 140 according to the preferred embodiment is an approximately rectangular or square volume adapted to fit within the master trap 110. It will be understood by a skilled addressee that the second trap 130 may take other shapes, as may be required for specific purposes. The third trap 140, in a preferred form, covers approximately half or less of the bottom surface area of the master trap 110. In this manner, sufficient volume is left over in the master trap 110 to receive overflow from the third trap 140, and to also locate a master draining aperture 510 (FIG. 5).

Handles 410 are provided on an inside of the third trap 140 to assist with the removal of the third trap 140 from the master trap 110. The third trap 140 has a location lug 131 to assist with positioning of the second trap 130 within the third trap 140.

Figure 5A:
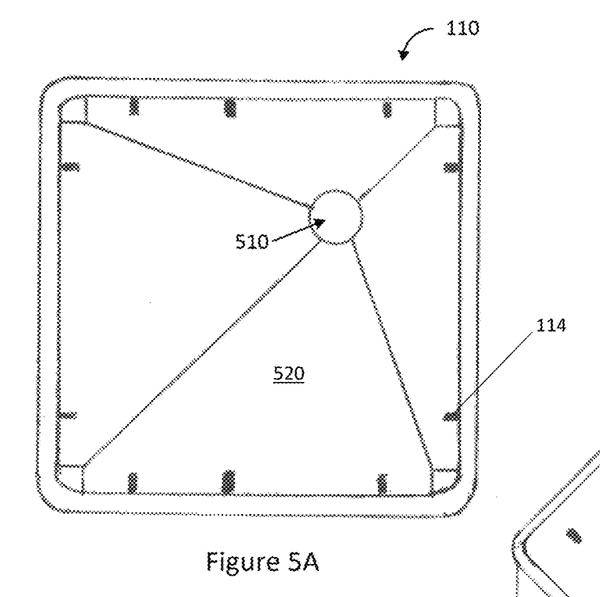
FIGS. 5A to 5C show top, perspective, and side views respectively of a master trap in the drainage system.
Figure 5B:
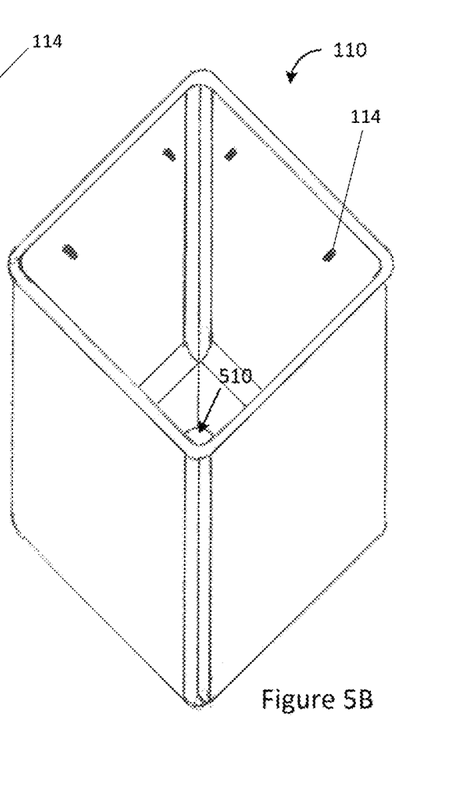
Figure 5C:
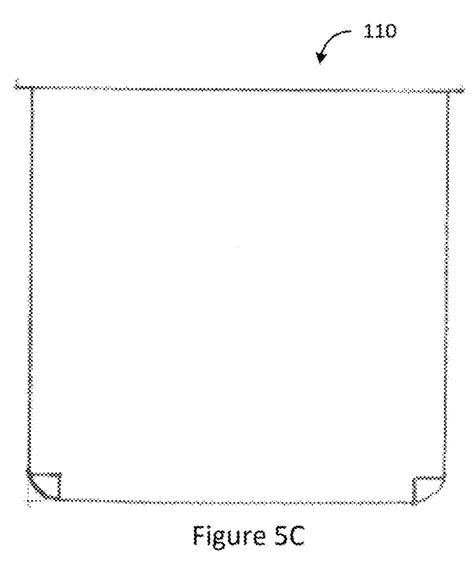

With reference to FIGS. 5A-5C, the master trap 110 is described in greater detail. The master trap 110 is sized and configured to receive therein the first trap 120, the second trap 130, and the third trap 140. A master draining aperture 510 is provided on the floor of the master trap 110 to discharge directly to the sewage or storm-water drainage systems. A floor 520 of the master trap 110 is sloped towards the master draining aperture 510 to assist with drainage. Positioning lugs 114 are provided on inner side surfaces of the master trap to position and hold in place the first trap 120.

Figures 6A, 6B:
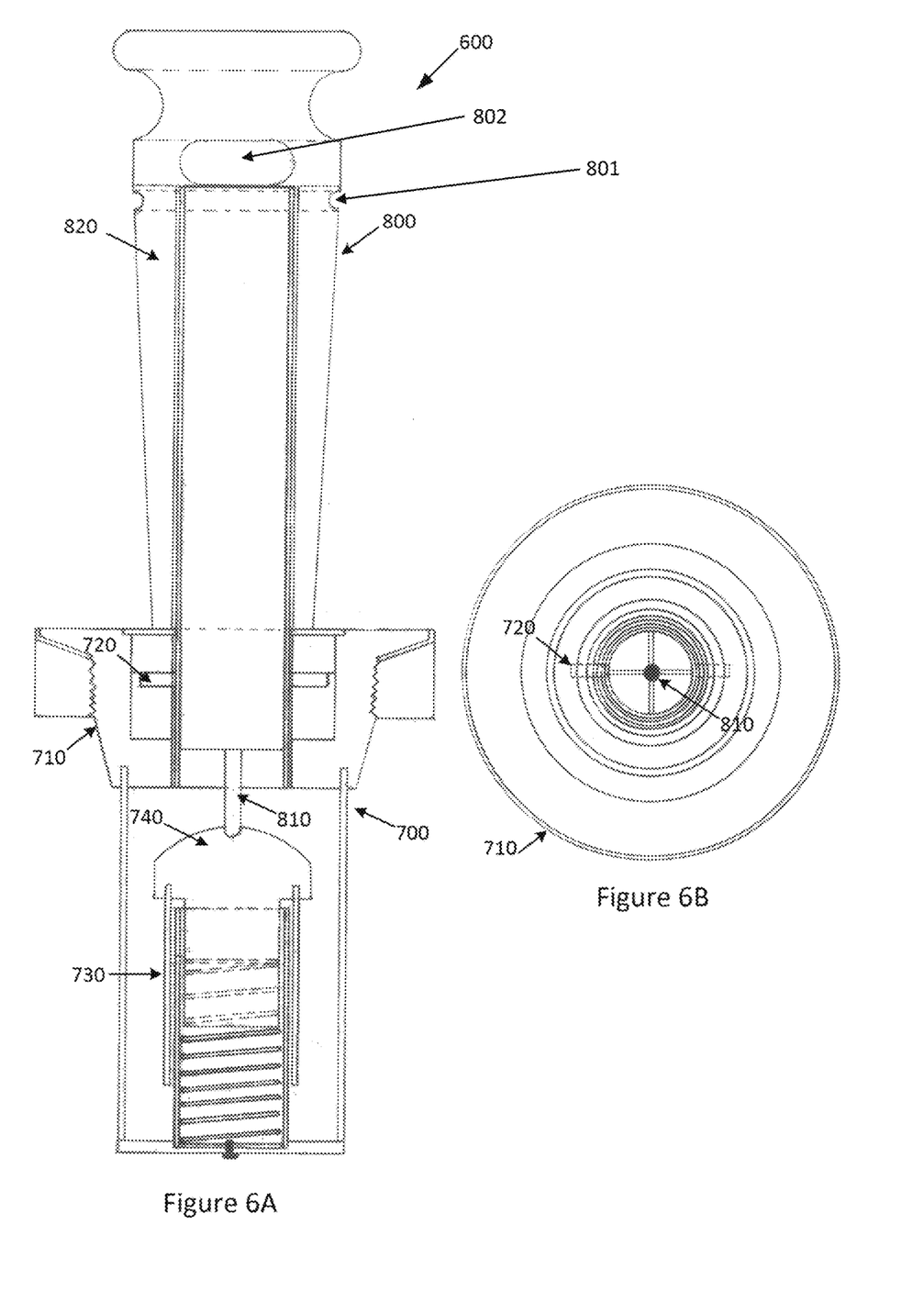
FIGS. 6A and 6B show side and top views of a riser-valve assembly.

With reference to FIGS. 6A and 6B, the riser-valve assembly 600 is described in greater detail. The riser valve-assembly 600 is designed to control the flow of liquid from the first trap 120 into the second trap 130. The riser-valve assembly 600 comprises a valve sub-assembly 700 and a riser sub-assembly 800. The riser-valve assembly 600, and more specifically the valve sub-assembly 700, is coupled to the first trap 120 via a collar 710 of the valve sub-assembly 700. In a preferred form, the collar 710 is coupled to the draining aperture 124 of the first trap 120 by a screw/threaded arrangement. The collar 710 further couples the riser sub-assembly 800 to the valve sub-assembly 700. In a preferred form, the riser sub-assembly 800 is coupled to the valve sub-assembly 700 by a bayonet coupling 720. The riser sub-assembly 800 is removable from the valve sub-assembly 700. The height of the riser sub-assembly 800 can preferably be altered for a particular purpose.

The riser-valve assembly 600 is configured such that a valve mechanism 730 of the valve sub-assembly 700 can close upon removal of the riser sub-assembly 800 from the collar 710.

The valve mechanism 730 is connected by a valve actuator 810 of the riser sub-assembly 800 to the mushroom valve 740. The spring-biased mushroom valve 740 is normally biased against the collar 710 to form a seal therewith. Insertion of the riser sub-assembly 800 into the collar 710 causes the valve actuator 810 to push against the mushroom valve 740, thereby releasing the seal.

Figure 7A:
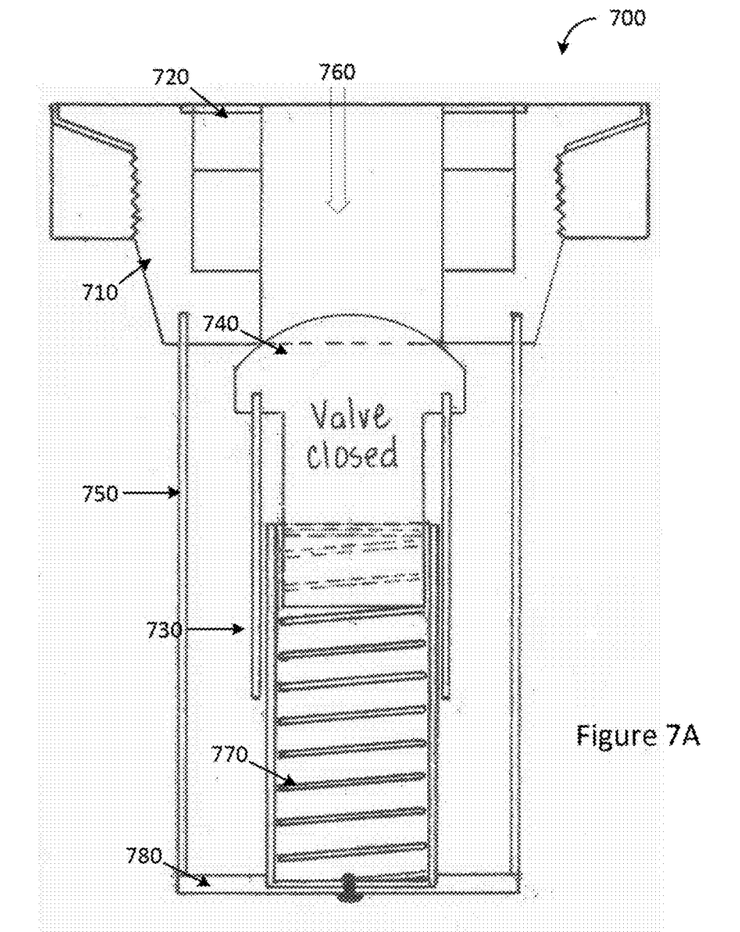
FIGS. 7A and 7B show side and bottom views of a valve sub-assembly in the riser-valve assembly.
Figure 7B:
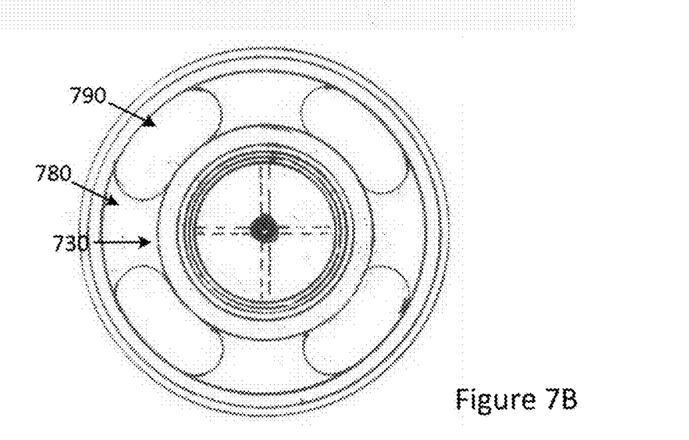
Figure 8A:
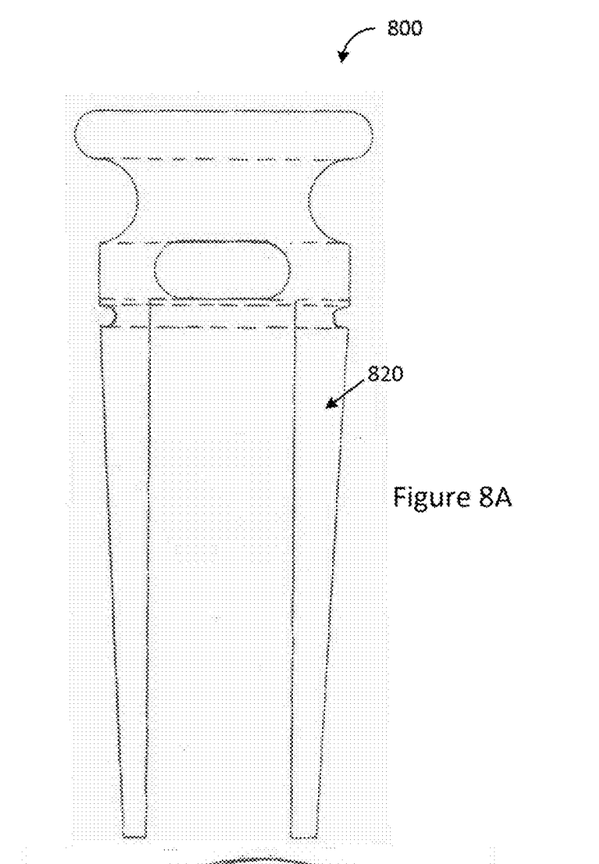
FIGS. 8A and 8B show side and top views of a riser sub-assembly.
Figure 8B:
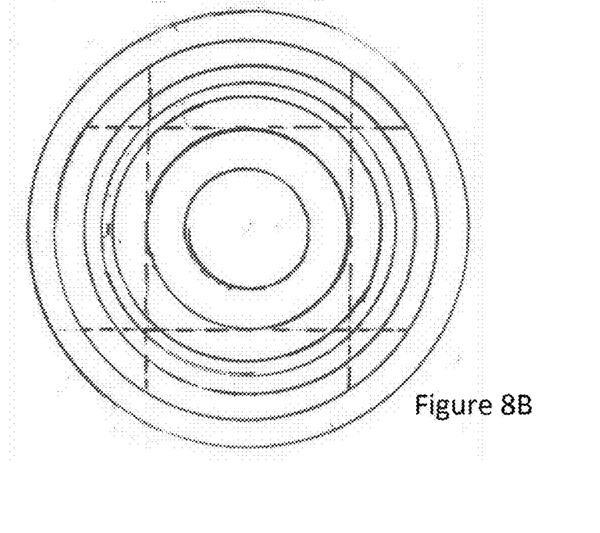

With reference now to FIGS. 7A and 7B, the valve sub-assembly 700 is described in greater detail. The valve sub-assembly 700 comprises the collar 710, valve mechanism 730, and valve sleeve 750. The collar 710 includes the aforementioned bayonet coupling 720 adapted to couple the collar 710 to the riser sub-assembly 800. The valve sleeve 750 is integrated with the collar 710, and together defines a conduit 760 for directing liquid from the first trap 120 to the second trap 130. The valve sleeve 750 also houses the valve mechanism 730.

The valve mechanism 730 includes the mushroom valve 740 and a valve biaser 770. The valve biaser 770, in a preferred form, is a spring. The valve biaser 770 is engaged with the mushroom valve 740 to bias the mushroom valve 740 towards a sealed position. In the sealed position, as illustrated in FIG. 7, the mushroom valve 740 is pressed against the collar 710 so as to seal off the conduit 760. The valve biaser 770 may be actuated to position the mushroom valve 740 in an unsealed position by the valve actuator 810. In the unsealed position, as illustrated in FIG. 6, the mushroom valve 740 is pressed away from the collar 710 so as to open the conduit 760. The valve mechanism 730 is supported within the valve sleeve 750 by a sleeve flange 780. The sleeve flange 780 mechanically connects and supports the valve mechanism 730 to a wall of the valve sleeve 750. The sleeve flange 780 is provided with one or more flange apertures 790 to permit a flow of liquid therethrough.

With reference now to FIGS. 8A 8B and FIGS. 9A 9B, the riser sub-assembly 800 is described in greater detail. The riser sub-assembly 800 comprises the netting sleeve 82, and a riser 830. The riser 830 is a generally cylindrical tube 835, opened at both ends. The riser 830 is provided with a height that is predetermined in consideration with a height/depth of the first trap 120. Specifically, the height of the riser 830, when coupled with the valve sub-assembly 800 and installed in the first trap 120, should be lower than the height/depth of the first trap 120. An inflow end 840 of the riser is opened to allow entry of liquid into the riser 830. An outflow end 850 is similarly opened to allow discharge of liquid from the riser 830 into the conduit 760 of the valve sub-assembly.

Figure 9A:
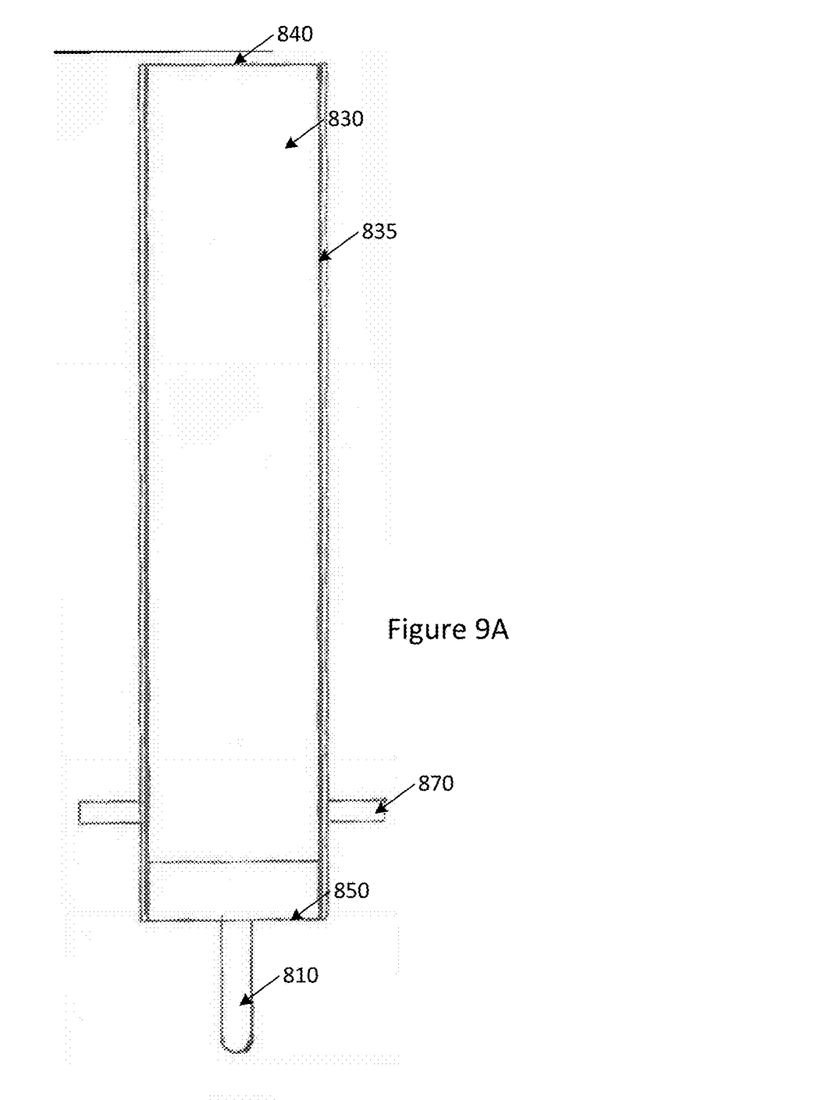
FIGS. 9A and 9B show side and top views of a riser in the riser sub-assembly.
Figure 9B:
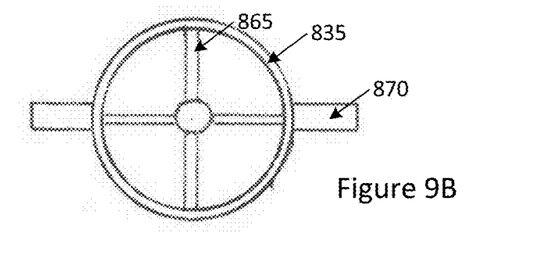

The outflow end 850 is fitted with the valve actuator 810. As best illustrated in FIG. 9B, the valve actuator 810 in one form is a protruding member, for example a rod positioned substantially centrally with respect to the cylindrical tube 835 and connected to the cylindrical tube by spokes 865. The valve actuator 810 is adapted to engage the mushroom valve 740 to actuate the mushroom valve 740 between the sealed and unsealed positions. Bayonet lugs 870 are attached to an outside of the cylindrical tube 835, adapted for coupling with the bayonet coupling 720 of the valve collar 710.

With reference to the figures, the use of the drainage system will be described. The first trap 120 is positioned within the master trap 110, with the flange 122 of the first trap 120 supported on the ledge 114 of the master trap 110. The valve sub-assembly 700 is coupled to the draining aperture 124, and the riser sub-assembly 800 is engaged with the valve sub-assembly 800. Accordingly, by virtue of the riser sub-assembly 800 being engaged with the valve sub-assembly 800, the mushroom valve 740 is depressed by the valve actuator 810 so that the mushroom valve 740 is in the unsealed position and the conduit 760 is open. The second trap 130 is positioned under the valve sub-assembly 700 and receives the valve sub-assembly 800 partially within its volume. The second trap 130 is positioned in the third trap 140, which is in turn is positioned in the master trap 110.

With the drainage system set up as described above, the particulate contaminated liquid to be drained by the drainage system 100 is received in the first trap 120. The particulate contaminated liquid may be received in the first trap 120, for example, by a hose, or other liquid propagation system connected to the source of the particulate contaminated liquid. The particulate contaminated liquid, after being received in the first trap 120, is allowed to settle where particulate matter settles onto the floor of the first trap 120.

The first trap 120 is preferably regularly cleaned of the particulate contaminants such that the particulate contaminated liquid does not reach the second trap 130. The first trap 120, in a preferred form, is cleaned of the particulate contaminants by removing the particulate contaminants therefrom using a filter bag 121 fitted thereto prior to use. In the preferred form, the filter bag 121 is lifted and removed from the first trap 120, and subsequently disposed of in an appropriate manner. In other forms, the particulate contaminants may be manually scooped from the first trap 120. The first trap 120 may be removed from the master trap 110 to facilitate manual scooping of the particulate contaminants therefrom. After the particulate contaminants are cleaned from the first trap 120, the remaining liquid can be drained safely away.

If the first trap 120 is not regularly cleaned of particulate contaminants, the particulate contaminants build up on the bottom of the first trap 120. The buildup reduces the available volume in the first trap 120 for receiving more particulate contaminated liquid. Accordingly, a point will be reached where the receipt of more particulate contaminated liquid causes the particulate contaminated liquid to rise to the height of the riser 830. Upon reaching the height of the riser 830, some of the particulate contaminated liquid spills over into the inflow end 840 of the riser, through the conduit 760 and into the second trap 130.

Moreover, if the buildup of particulate contaminants in the first trap 120 reaches the height of the riser 830, further addition of particulate contaminated liquid will see the particulate contaminated liquid overflow directly down the riser 830 and into the second trap 130. If the volume and/or rate of new particulate contaminated liquid is greater than that being drained through the riser 830, the particulate contaminated liquid will reach a height in the first trap 120 where the drainage perforations 230 are located, and the particulate contaminated liquid drained through the drainage perforations 230 directly to the third trap 140.

Particulate contaminated liquid draining into the second trap 130 is held in the second trap 130 and allowed to settle. Accordingly, the second trap 130 provides a further opportunity to separate particulate contaminants from the particulate contaminated liquid. The second trap 130 is preferably cleaned of particulate contaminants on a periodic basis. In the preferred form, a filter bag is fitted to the second trap 130 prior to use such that cleaning the second trap 130 of particulate contaminants is conveniently effected by removing the filter bag from the second trap 130, with the particulate contaminants contained therein. The second trap 130 can also be lifted from within the master trap 110 to make cleaning thereof more convenient. The handles 310 provided on the outside of the second trap 130 facilitate lifting and removal of the second trap 130 from within the third trap 140.

If the second trap 130 is not periodically cleaned, particulate contaminants will build up on a floor thereof, thereby reducing available volume for the second trap 130 to receive further particulate contaminated liquid from the first trap 120. At some point, the receipt of further particulate contaminated liquid into the second trap 130 will result in some of the particulate contaminated liquid over spilling from the second trap 130. The overflow is caught in the third trap 140. Continued settlement and separation of particulate contaminants from the particulate contaminated liquid will still occur in the second trap, however, until such time as the buildup of particulate contaminants in the second trap 130 reaches a height where the valve sub-assembly 700 begins.

When the buildup of particulate contaminants in the second trap 130 reaches the valve sub-assembly 700, the buildup blocks off a bottom of the conduit 760. Accordingly, further particulate contaminated liquid from the first trap 120 is prevented from entering the second trap 130. At this point, the passage of further particulate contaminated liquid from the first trap 120 is prevented and particulate contaminated liquid collects in the first trap 120 and eventually overflows through the drainage perforations 230 to the third trap 140. The flooding of the first trap 120 acts as an unmistakable sign that the first trap 120 and or the second trap 130 require cleaning and maintenance.

Accordingly, a self-regulating arrangement is effected, whereby an excessive buildup of contaminants causes a shut down of the system and force human intervention. The point at which the self-regulating arrangement takes effect is determined by the inter-relationship between the valve sub-assembly 700 and the second trap 130. More specifically, the degree to which the valve sub-assembly 700 is received within the volume of the second trap 130 determines the point at which shut down occurs.

The drainage system 100 of the present invention allows for the thorough treatment of particulate contaminated liquids. The employment of a top mounted master trap 110, as well as a first trap 120, second trap 130, and third trap 140 all situated within the master trap 110 allows for convenient and easy maintenance of the system. The interrelationship between the valve sub-assembly 700 and the second trap 130 allows for the normal flow of particulate contaminated liquid in the drainage system 100 to be disrupted by the particulate contaminants themselves. Accordingly, a failsafe block-off is achieved, which subsequently raises unmistakable signs that cleaning and maintenance is required.

ADVANTAGES

The present invention provides a drainage system which separates particulate contaminants from the liquid in which they are suspended. The sink assembly includes a master trap and at least a first trap with a riser and valve assembly to collect particulates and prevent overflow from the master trap. The sink assembly provides a simple maintenance and cleaning solution.

In one form the top mounted arrangement of the first trap 120 within the master trap 110 simplifies maintenance and cleaning of the system by allowing the first trap 120 to be lift out from the master trap 110 for cleaning. The rise-valve assembly 800 further provides a simple sealing mechanism to prevent contaminated liquids from draining from the first trap 120, for example when removing the first trap 120 for maintenance and cleaning.

The present invention provides multiple contaminant separation stages, thereby achieving a high level of contaminant separation. The multiple contaminant separation stages further provide multiple levels of failsafe, in the event that one or more stages experience failure.

The present invention provides a failsafe cutoff mechanism that is triggered and effected by the buildup of particulate contaminants itself. The cutoff mechanism is not reliant on fallible sensors nor mechanical systems and accordingly provides an extremely high level of reliability.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A sink assembly comprising:
   a master trap;

a first trap mountable within the master trap, the first trap being positionable on a plurality of lugs or ledge extending inwardly from an inner surface of the master trap, said first trap having a first trap draining aperture, and said first trap having one or more drainage perforations surrounding the top of the first trap;

a second trap mountable below the first trap draining aperture;

a third trap being positionable within the master trap and having the second trap located therein for receiving any liquid overflowing from the second trap; and a riser and valve assembly coupled to the first trap draining aperture and configured to control a flow of liquid from the first trap into the second trap, and a valve of the riser and valve assembly automatically closing off flow through the first trap draining aperture when an actuator portion of the riser and valve assembly is removed, wherein the height of an opening in the riser and valve assembly is lower than the height of the top of the first trap, thereby allowing liquid to pass through the riser and valve and flow into the second trap rather than overflow the first trap, and liquid overflowing the first trap can drain through the one or more drainage perforations.

2. The sink assembly as claimed in or claim 1, wherein the riser and valve assembly is a spring biased assembly to close the valve following removal of the actuator portion.

3. The sink assembly as claimed in claim 1, wherein a disposable filter bag is positionable within the first trap to collect settled particulate matter.

4. The sink assembly as claimed in claim 1, wherein a disposable filter bag is positionable within the first trap and second trap to collect settled particulate matter.

5. The sink assembly as claimed in claim 1, wherein a disposable filter bag is positionable within the first trap, second trap and third trap to collect settled particulate matter.

6. The sink assembly as claimed in claim 1, wherein one or more of the traps have a handle to assist in removing the trap.

7. The sink assembly as claimed in claim 1, wherein the valve of the riser and valve assembly is a mushroom valve positioned within a conduit, the mushroom valve configured to actuate between a sealed position and an unsealed position, wherein in the sealed position the conduit is sealed to prevent draining of liquid from the first trap through to the second trap.

8. The sink assembly as claimed in claim 7, wherein the riser and valve assembly includes a valve biaser, the valve biaser coupled to the mushroom valve and adapted to bias the mushroom valve towards the sealed position.

* * * * *

UNITED STATES PATENT AND TRADEMARK OFFICE
CERTIFICATE OF CORRECTION

| | | |
|---|---|---|
| PATENT NO. | : 9,834,915 B2 | Page 1 of 1 |
| APPLICATION NO. | : 14/680567 | |
| DATED | : December 5, 2017 | |
| INVENTOR(S) | : Craig Hanson | |

It is certified that error appears in the above-identified patent and that said Letters Patent is hereby corrected as shown below:

On the Title Page

Item (30) should read:
(30)    Foreign Application Priority Data
June 24, 2014   (AU) ................. 2014203445

Signed and Sealed this
Twenty-fourth Day of July, 2018

Andrei Iancu
*Director of the United States Patent and Trademark Office*